(12) United States Patent
Huang et al.

(10) Patent No.: US 10,984,228 B2
(45) Date of Patent: Apr. 20, 2021

(54) INTERACTION BEHAVIOR DETECTION METHOD, APPARATUS, SYSTEM, AND DEVICE

(71) Applicant: Alibaba Group Holding Limited, George Town (KY)

(72) Inventors: Kaiming Huang, Hangzhou (CN); Xiaobo Zhang, Hangzhou (CN); Chunlin Fu, Hangzhou (CN); Hongbo Cai, Hangzhou (CN); Li Chen, Hangzhou (CN); Le Zhou, Hangzhou (CN); Xiaodong Zeng, Hangzhou (CN); Feng Lin, Hangzhou (CN)

(73) Assignee: Advanced New Technologies Co., Ltd., Grand Cayman (KY)

( * ) Notice: Subject to any disclaimer, the term of this patent is extended or adjusted under 35 U.S.C. 154(b) by 0 days.

(21) Appl. No.: 16/888,560

(22) Filed: May 29, 2020

(65) Prior Publication Data
US 2020/0293766 A1 Sep. 17, 2020

Related U.S. Application Data

(63) Continuation of application No. PCT/CN2018/125286, filed on Dec. 29, 2018.

(30) Foreign Application Priority Data

Jan. 26, 2018 (CN) .......................... 201810077811.X

(51) Int. Cl.
*G06K 9/00* (2006.01)
*G06K 9/20* (2006.01)
*G06K 9/46* (2006.01)

(52) U.S. Cl.
CPC ..... *G06K 9/00335* (2013.01); *G06K 9/00214* (2013.01); *G06K 9/2054* (2013.01); *G06K 9/4604* (2013.01)

(58) Field of Classification Search
CPC .......... G06K 9/00335; G06K 9/00214; G06K 9/2054; G06K 9/4604
See application file for complete search history.

(56) References Cited

U.S. PATENT DOCUMENTS

| 9,727,838 B2 | 8/2017 | Campbell |
| 2008/0181507 A1* | 7/2008 | Gope ...................... G06T 7/194 382/190 |

(Continued)

FOREIGN PATENT DOCUMENTS

| CN | 102215721 | 10/2011 |
| CN | 102236910 | 11/2011 |

(Continued)

OTHER PUBLICATIONS

Crosby et al., "BlockChain Technology: Beyond Bitcoin," Sutardja Center for Entrepreneurship & Technology Technical Report, Oct. 16, 2015, 35 pages.

(Continued)

*Primary Examiner* — Sean M Connor
(74) *Attorney, Agent, or Firm* — Fish & Richardson P.C.

(57) ABSTRACT

Implementations of the present specification provide an interaction behavior detection method, apparatus, system, and device. The method includes the following: obtaining a to-be-detected depth image photographed by a depth photographing device, extracting a foreground image used to represent a moving object from the to-be-detected depth image, obtaining spatial coordinate information of the moving object based on the foreground image, comparing the spatial coordinate information of the moving object with spatial coordinate information of a shelf in a rack, and determining an article touched by the moving object based on a comparison result and one or more articles on the shelf.

15 Claims, 6 Drawing Sheets

(56) References Cited

U.S. PATENT DOCUMENTS

| | | | | |
|---|---|---|---|---|
| 2012/0127276 | A1* | 5/2012 | Tsai | G06K 9/4671 |
| | | | | 348/47 |
| 2012/0250982 | A1* | 10/2012 | Ito | G06T 7/12 |
| | | | | 382/159 |
| 2013/0243240 | A1 | 9/2013 | Marks et al. | |
| 2016/0171332 | A1* | 6/2016 | Kawano | G06K 9/00771 |
| | | | | 382/173 |
| 2016/0253571 | A1* | 9/2016 | Campbell | G06T 5/40 |
| | | | | 382/195 |
| 2017/0178060 | A1* | 6/2017 | Schwartz | G06K 9/6267 |
| 2017/0185828 | A1* | 6/2017 | Yamamoto | G06K 9/46 |

FOREIGN PATENT DOCUMENTS

| | | | |
|---|---|---|---|
| CN | 104463899 | | 3/2015 |
| CN | 105519102 | | 4/2016 |
| CN | 105607635 | | 5/2016 |
| CN | 105701519 | | 6/2016 |
| CN | 105912999 | | 8/2016 |
| CN | 106104610 | | 11/2016 |
| CN | 106347919 | | 1/2017 |
| CN | 107045641 | | 8/2017 |
| CN | 107403332 | | 11/2017 |
| CN | 107403332 A | * | 11/2017 |
| CN | 108364316 | | 8/2018 |
| TW | I578272 | | 4/2017 |

OTHER PUBLICATIONS

Nakamoto, "Bitcoin: A Peer-to-Peer Electronic Cash System," www.bitcoin.org, 2005, 9 pages.

PCT International Search Report and Written Opinion in International Appln No. PCT/CN2018/125286, dated Mar. 27, 2019, 10 pages (with partial English translation).

* cited by examiner

INTERACTION BEHAVIOR DETECTION METHOD, APPARATUS, SYSTEM, AND DEVICE

TECHNICAL FIELD

The present specification relates to the field of detection technologies, and in particular, to interaction behavior detection methods, apparatuses, systems, and devices.

BACKGROUND

With the rapid development of the social economy, various articles (also referred to as goods, products, etc.) are a feast for the eyes. Articles can be displayed in many ways. Articles can be displayed online by using pictures of the articles, for example. In brick-and-mortar places such as supermarkets and shopping malls, articles can be placed on a rack for display. In a brick-and-mortar place, when a moving object touches an article, it can not only reflect an interest of the moving object in the article, but can also remind a merchant that the article may be taken away by the moving object, so that the merchant decides whether to replenish articles, improve the placement of articles, etc. The moving object can be a customer, or can be an object such as a robot controlled by the customer. Therefore, it is particularly important to provide a solution for reliably determining whether a moving object touches an article.

SUMMARY

To alleviate a problem in related technologies, the present specification provides interaction behavior detection methods, apparatuses, systems, and devices.

An interaction behavior detection system is provided, where the system includes a depth photographing device and a processing device, the depth photographing device is disposed above a rack, and a photographing range of the depth photographing device includes an outer edge of each shelf in the rack and a specified aisle area. The depth photographing device is configured to photograph a to-be-detected depth image including the rack and the specified aisle area at a specified angle, where the depth image includes depth information of an actual object corresponding to a pixel relative to a plane on which the depth photographing device is located; and the processing device is configured to obtain the to-be-detected depth image from the depth photographing device; extract a foreground image used to represent a moving object from the to-be-detected depth image, and obtain spatial coordinate information of the moving object based on the foreground image; and compare the spatial coordinate information of the moving object with spatial coordinate information of a shelf in the rack, and determine an article touched by the moving object based on a comparison result and one or more articles on the shelf, where the spatial coordinate information of the shelf is obtained based on a background depth image, and the background depth image is a depth image that is photographed by the depth photographing device at a specified angle and includes no foreground image.

In an optional implementation, the processing device is further configured to pre-determine the spatial coordinate information of the shelf in the rack, including the following: obtaining a first background depth image set that is photographed by the depth photographing device at a specified angle and includes no foreground image; determining a shelf edge line in the first background depth image set; converting pixel coordinates of the shelf edge line based on a camera calibration method of the depth photographing device, to obtain two-axis spatial coordinate information in actual spatial coordinate information of a shelf; and for edge lines of the same shelf, clustering depth information of pixels of the shelf edge lines to obtain third-axis spatial coordinate information in the actual spatial coordinate information of the shelf.

In an optional implementation, the determining, by the processing device, a shelf edge line in the first background depth image set includes the following: preprocessing the first background depth image set, where the preprocessing includes at least image averaging and image denoising; performing edge detection on a preprocessed image; and performing straight line detection on an image obtained through edge detection at a predetermined angle, and filtering out a straight line whose length is less than a predetermined length threshold to obtain the shelf edge line in the first background depth image set, where the predetermined angle is determined based on a relative position relationship between the depth photographing device and the rack.

In an optional implementation, the extracting, by the processing device, a foreground image used to represent a moving object from the to-be-detected depth image includes the following: obtaining a background image, where the background image is obtained by performing background modeling based on a second background depth image set, and the second background depth image set is a depth image set that is photographed by the depth photographing device at a specified angle and includes no foreground image; and comparing the to-be-detected depth image with the background image, and extracting the foreground image used to represent the moving object from the to-be-detected depth image.

In an optional implementation, the spatial coordinate information of the moving object includes spatial coordinate information of a part closest to the rack in the moving object, and the obtaining, by the processing device, spatial coordinate information of the moving object based on the foreground image includes the following: converting pixel coordinates of a part closest to the rack in the foreground image based on a camera calibration method of the depth photographing device, to obtain two-axis spatial coordinate information of the part closest to the rack in the moving object; and determining third-axis spatial coordinate information of the part closest to the rack in the moving object based on depth information of a pixel of the part closest to the rack in the foreground image.

In an optional implementation, articles placed on the same shelf in the rack are the same, and that the processing device is configured to compare the spatial coordinate information of the moving object with spatial coordinate information of a shelf in the rack, and determine an article touched by the moving object based on a comparison result and one or more articles on the shelf includes the following: determining, based on the spatial coordinate information of the moving object and the spatial coordinate information of the shelf in the rack, whether the moving object extends into the rack by using the two-axis spatial coordinate information obtained by converting pixel coordinates in the spatial coordinate information, and determining a shelf into which the moving object extends in the rack by using the third-axis spatial coordinate information obtained by converting depth information in the spatial coordinate information; and determining an article corresponding to the determined shelf as the article touched by the moving object based on a predetermined correspondence between shelves and articles.

An interaction behavior detection method is provided, where the method includes the following: obtaining a to-be-detected depth image from a depth photographing device, where the depth photographing device is disposed above a rack, and a photographing range of the depth photographing device includes an outer edge of each shelf in the rack and a specified aisle area; extracting a foreground image used to represent a moving object from the to-be-detected depth image, and obtaining spatial coordinate information of the moving object based on the foreground image; and comparing the spatial coordinate information of the moving object with spatial coordinate information of a shelf in the rack, and determining an article touched by the moving object based on a comparison result and one or more articles on the shelf, where the spatial coordinate information of the shelf is obtained based on a background depth image, and the background depth image is a depth image that is photographed by the depth photographing device at a specified angle and includes no foreground image.

In an optional implementation, the pre-determining process of the spatial coordinate information of the shelf in the rack includes the following: obtaining a first background depth image set that is photographed by the depth photographing device at a specified angle and includes no foreground image; determining a shelf edge line in the first background depth image set; converting pixel coordinates of the shelf edge line based on a camera calibration method of the depth photographing device, to obtain two-axis spatial coordinate information in actual spatial coordinate information of a shelf; and for edge lines of the same shelf, clustering depth information of pixels of the shelf edge lines to obtain third-axis spatial coordinate information in the actual spatial coordinate information of the shelf.

In an optional implementation, the determining a shelf edge line in the first background depth image set includes the following: preprocessing the first background depth image set, where the preprocessing includes at least image averaging and image denoising; performing edge detection on a preprocessed image; and performing straight line detection on an image obtained through edge detection at a predetermined angle, and filtering out a straight line whose length is less than a predetermined length threshold to obtain the shelf edge line in the first background depth image set, where the predetermined angle is determined based on a relative position relationship between the depth photographing device and the rack.

In an optional implementation, the extracting a foreground image used to represent a moving object from the to-be-detected depth image includes the following: obtaining a background image, where the background image is obtained by performing background modeling based on a second background depth image set, and the second background depth image set is a depth image set that is photographed by the depth photographing device at a specified angle and includes no foreground image; and comparing the to-be-detected depth image with the background image, and extracting the foreground image used to represent the moving object from the to-be-detected depth image.

In an optional implementation, the method further includes the following: comparing foreground positions of foreground images extracted from adjacent to-be-detected depth images, where the adjacent to-be-detected depth images are to-be-detected depth images photographed by the depth photographing device at adjacent time points; and determining a group of foreground images closest to each other in adjacent to-be-detected depth images as the same foreground image, and obtaining a moving path of the moving object corresponding to the foreground image.

In an optional implementation, the spatial coordinate information of the moving object includes spatial coordinate information of a part closest to the rack in the moving object, and the obtaining spatial coordinate information of the moving object based on the foreground image includes the following: converting pixel coordinates of a part closest to the rack in the foreground image based on a camera calibration method of the depth photographing device, to obtain two-axis spatial coordinate information of the part closest to the rack in the moving object; and determining third-axis spatial coordinate information of the part closest to the rack in the moving object based on depth information of a pixel of the part closest to the rack in the foreground image.

In an optional implementation, articles placed on the same shelf in the rack are the same, and the comparing the spatial coordinate information of the moving object with spatial coordinate information of a shelf in the rack, and determining an article touched by the moving object based on a comparison result and one or more articles on the shelf includes the following: determining, based on the spatial coordinate information of the moving object and the spatial coordinate information of the shelf in the rack, whether the moving object extends into the rack by using the two-axis spatial coordinate information obtained by converting pixel coordinates in the spatial coordinate information, and determining a shelf into which the moving object extends in the rack by using the third-axis spatial coordinate information obtained by converting depth information in the spatial coordinate information; and determining an article corresponding to the determined shelf as the article touched by the moving object based on a predetermined correspondence between shelves and articles.

An interaction behavior detection apparatus is provided, where the apparatus includes an image acquisition module, configured to obtain a to-be-detected depth image from a depth photographing device, where the depth photographing device is disposed above a rack, and a photographing range of the depth photographing device includes an outer edge of each shelf in the rack and a specified aisle area; a foreground extraction module, configured to extract a foreground image used to represent a moving object from the to-be-detected depth image; a coordinate determining module, configured to obtain spatial coordinate information of the moving object based on the foreground image; and an interaction article determining module, configured to compare the spatial coordinate information of the moving object with spatial coordinate information of a shelf in the rack, and determine an article touched by the moving object based on a comparison result and one or more articles on the shelf, where the spatial coordinate information of the shelf is obtained based on a background depth image, and the background depth image is a depth image that is photographed by the depth photographing device at a specified angle and includes no foreground image.

A computer device is provided, including a processor and a memory, configured to store a processor-executable instruction. The processor is configured to obtain a to-be-detected depth image from a depth photographing device, where the depth photographing device is disposed above a rack, and a photographing range of the depth photographing device includes an outer edge of each shelf in the rack and a specified aisle area; extract a foreground image used to represent a moving object from the to-be-detected depth image, and obtain spatial coordinate information of the moving object based on the foreground image; and compare the spatial coordinate information of the moving object with spatial coordinate information of a shelf in the rack, and determine an article touched by the moving object based on a comparison result and one or more articles on the shelf, where the spatial coordinate information of the shelf is obtained based on a background depth image, and the background depth image is a depth image that is photographed by the depth photographing device at a specified angle and includes no foreground image.

The technical solutions provided in the implementations of the present specification can have the following beneficial effects:

In the implementations of the present specification, a to-be-detected depth image photographed by a depth photographing device is obtained, a foreground image used to represent a moving object is extracted from the to-be-detected depth image, spatial coordinate information of the moving object is obtained based on the foreground image, the spatial coordinate information of the moving object is compared with spatial coordinate information of a shelf in a rack, and an article touched by the moving object is determined based on a comparison result and one or more articles on the shelf. As such, the article touched by the moving object can be determined without a need to dispose a pressure sensor at each position of each shelf, so that maintenance costs are reduced.

It should be understood that the previous general description and the following detailed description are merely examples for explanation, and impose no limitation on the present specification.

BRIEF DESCRIPTION OF DRAWINGS

The accompanying drawings, which are incorporated in and constitute a part of the present specification, illustrate implementations consistent with the present specification and serve to explain the principles of the present specification together with the present specification.

DESCRIPTION OF IMPLEMENTATIONS

Example implementations are described in detail here, and examples of the example implementations are presented in the accompanying drawings. When the following description relates to the accompanying drawings, unless specified otherwise, the same numbers in different accompanying drawings represent same or similar elements. Implementations described below do not represent all implementations consistent with the present specification. On the contrary, the implementations are only examples of apparatuses and methods that are described in the appended claims in detail and consistent with some aspects of the present specification.

The terms used in the present specification are merely for illustrating specific implementations, and are not intended to limit the present specification. The terms "a" and "the" of singular forms used in the present specification and the appended claims are also intended to include plural forms, unless otherwise specified in the context clearly. It should be further understood that the term "and/or" used in the present specification indicates and includes any or all possible combinations of one or more associated listed items.

It should be understood that although terms "first", "second", "third", etc. may be used in the present specification to describe various types of information, the information is not limited to the terms. These terms are only used to differentiate between information of the same type. For example, without departing from the scope of the present specification, first information can also be referred to as second information, and similarly, the second information can be referred to as the first information. Depending on the context, for example, the word "if" used here can be explained as "while", "when", or "in response to determining".

In a brick-and-mortar place, articles are usually placed on a rack for display. In the brick-and-mortar place, when a moving object touches an article, it can not only reflect an interest of the moving object in the article, but also remind a merchant that the article may be taken away by the moving object, so that the merchant decides whether to replenish articles, improve the placement of articles, etc.

In view of this, the present specification provides an interaction behavior detection system, so that an article touched by a moving object can be determined by using a constructed interaction behavior detection system including a depth photographing device and a processing device. The following describes the implementations of the present specification by using examples with reference to the accompanying drawings.

Figure 1A:
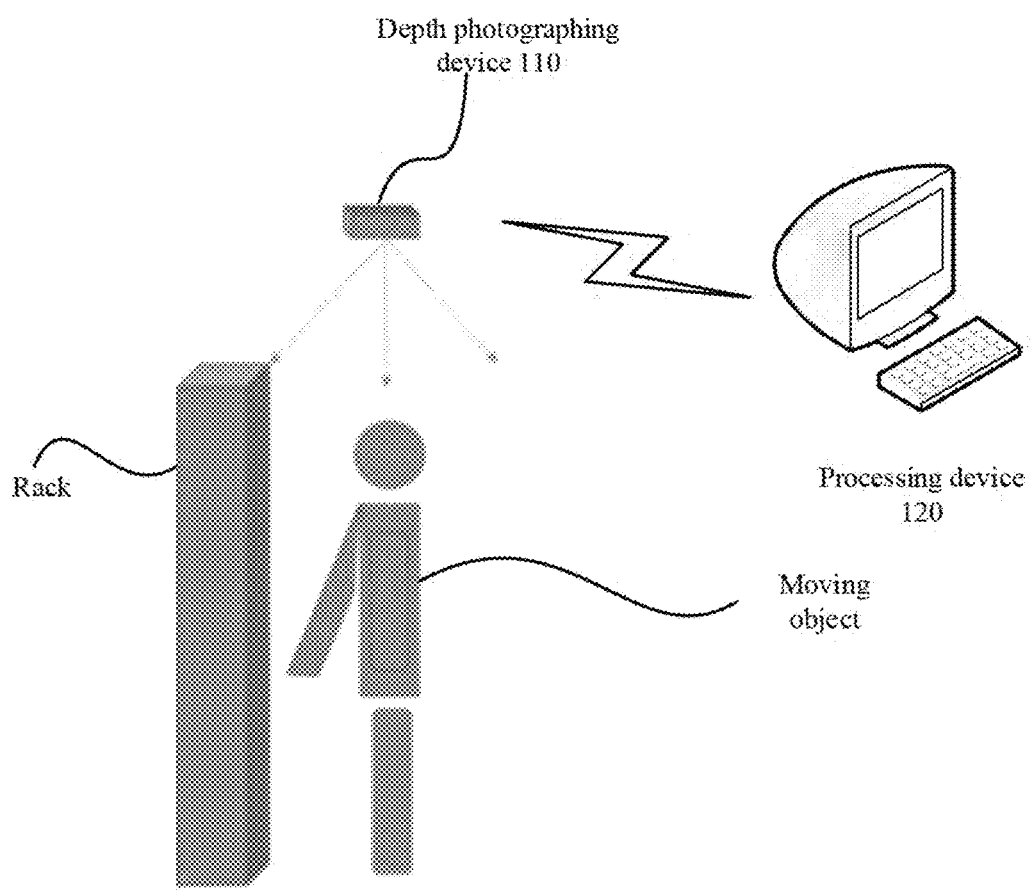
FIG. 1A is a schematic structural diagram illustrating an interaction behavior detection system, according to an example implementation of the present specification.

As shown in FIG. 1A, FIG. 1A is a schematic structural diagram illustrating an interaction behavior detection system, according to an example implementation of the present specification. In the schematic diagram, the interaction behavior detection system includes a depth photographing device 110 and a processing device 120. The depth photographing device 110 is disposed above a rack, and a photographing range of the depth photographing device 110 includes an outer edge of each shelf in the rack and a specified aisle area.

The specified aisle area can be an aisle needed by a moving object to obtain an article on a shelf. The shelf outer edge is the edge facing an aisle. The moving object can see and touch the shelf outer edge when standing on the aisle and facing the rack. An edge line of the shelf outer edge can be a straight line or an approximately straight line.

Figure 1B:
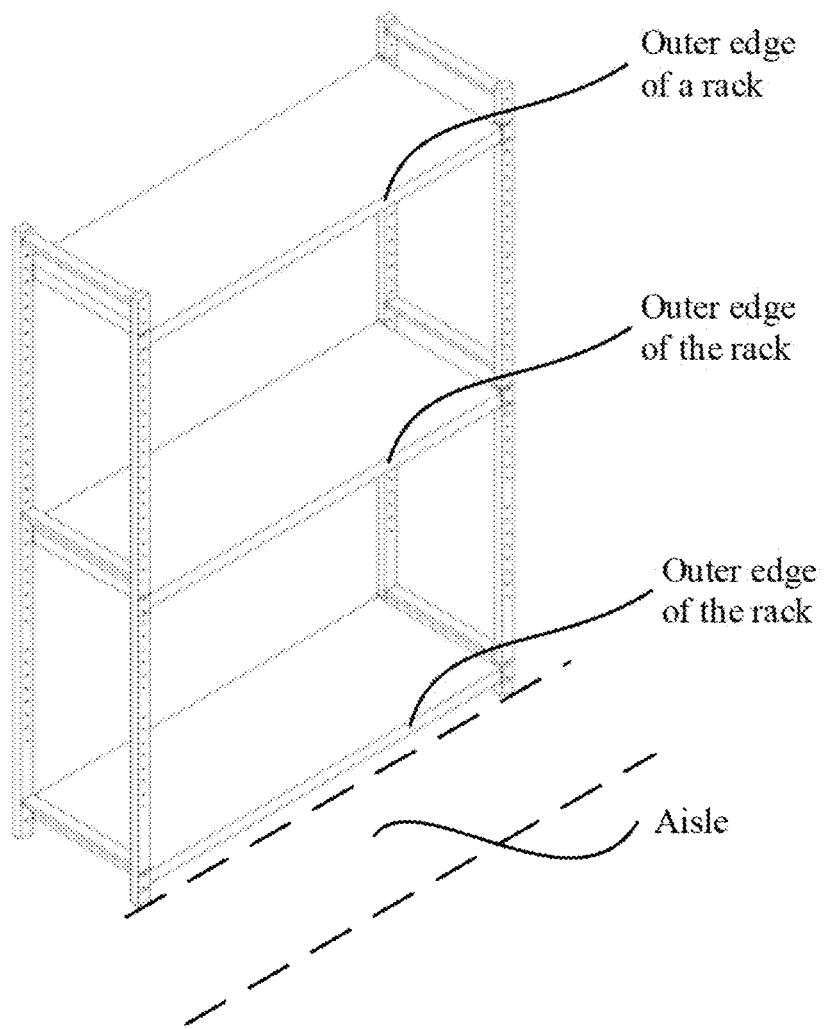
FIG. 1B is a schematic diagram illustrating a shelf outer edge, according to an example implementation of the present specification.

In one scenario, for some racks, only one side faces a moving object/aisle and articles are displayed towards the aisle on the side, and other sides may lean against walls or connect to other racks and therefore are hidden. As shown in FIG. 1B, FIG. 1B is a schematic diagram illustrating a shelf outer edge, according to an example implementation of the present specification. In the schematic diagram, the shelf outer edge is described by using an example that only one side of a rack faces an aisle. A photographing range of a depth photographing device includes at least an outer edge of the rack and an area where the aisle is located (a specified aisle area).

In some other scenarios, for some racks, at least two sides can face aisles and articles are displayed towards the aisles on the sides. Therefore, a moving object can obtain an article from different sides of the rack. For example, to better satisfy photographing range needs of a depth photographing device, corresponding depth photographing devices can be disposed for different aisles, so that a photographing range of the depth photographing device includes an outer edge of each shelf in a rack and a specified aisle area. For example, shelf outer edge A on side A of a rack faces aisle A, and shelf outer edge B on side B of the rack faces aisle B. Depth photographing device A and depth photographing device B can be disposed above the rack. A photographing range of depth photographing device A includes at least shelf outer edge A and aisle A, and a photographing range of depth photographing device B includes at least shelf outer edge B and aisle B.

The same depth photographing device can photograph one or more racks. A quantity of racks can be determined based on a photographing range of the depth photographing device and rack dimensions, so that the depth photographing device can photograph at least an outer edge of each shelf in the rack and an aisle corresponding to the rack. Further, the deep photographing device can also photograph a top surface of the rack, so as to obtain a rack plan view of the rack from top to bottom.

For example, a relative position relationship between a depth photographing device and a rack can be as follows: A vertical distance between the depth photographing device and a plane on which a shelf outer edge is located can range from 30 cm to 50 cm, and a vertical distance between the depth photographing device and the ground can range from 2.6 m to 3 m. The head, shoulder, arm, etc. of a moving object can be observed from top to bottom by using the depth photographing device.

The moving object can be an object that may interact with articles. For example, the moving object can be a customer, a robot controlled by the customer, or an object such as a merchant.

The depth photographing device is a photographing device that can detect a depth, so that depth information (distance information) of an actual object corresponding to a pixel included in a depth image relative to a plane on which the depth photographing device is located can be obtained. For example, the depth photographing device can be a structured-light photographing device, so that distance measurement can be implemented by using the structured-light photographing device. In a depth image, a grayscale value of each pixel can be used to represent depth information of an actual object corresponding to the pixel relative to the plane on which the depth photographing device is located. The actual object corresponding to the pixel can be a part of a real scene corresponding to each pixel in the depth image. The depth image is an image obtained by photographing the real scene by using the depth photographing device.

In the detection system, the depth photographing device can be configured to photograph a to-be-detected depth image including a rack and a specified aisle area at a specified angle. The depth photographing device can perform detection at a specific frequency when a detection condition is satisfied, to obtain the to-be-detected depth image. The detection condition can be that the depth photographing device is started, a specified detection time arrives, a detection instruction is received, etc. The processing device can be configured to obtain the to-be-detected depth image from the depth photographing device; extract a foreground image used to represent a moving object from the to-be-detected depth image, and obtain spatial coordinate information of the moving object based on the foreground image; and compare the spatial coordinate information of the moving object with spatial coordinate information of a shelf in the rack, and determine an article touched by the moving object based on a comparison result and one or more articles on the shelf, where the spatial coordinate information of the shelf is obtained based on a background depth image, and the background depth image is a depth image that is photographed by the depth photographing device at a specified angle and includes no foreground image.

Because the foreground image is extracted from the to-be-detected depth image, the foreground image also includes depth information of an actual object corresponding to a pixel relative to a plane on which the depth photographing device is located, namely, depth information of the moving object. In addition, pixel coordinates in the depth image can represent a position relationship between two axes of a photographed object (a real scene). Therefore, the spatial coordinate information of the moving object can be obtained based on the foreground image. The spatial coordinate information of the shelf in the rack usually does not change. Therefore, the spatial coordinate information of the shelf in the rack can be pre-determined and stored. After the depth information of the moving object is obtained, the spatial coordinate information of the moving object can be compared with the spatial coordinate information of the shelf in the rack, to determine a shelf touched by the moving object and a touched relative position of the shelf. In addition, because a correspondence between shelves and articles can be obtained, the article touched by the moving object can be obtained.

It can be seen from the previous implementation that a to-be-detected depth image is obtained from a depth photographing device that is set based on some specific strategies, and an article touched by a moving object can be determined after corresponding processing, so that the article touched by the moving object can be determined without a need to dispose a pressure sensor at each location of each shelf, thereby reducing maintenance costs. In addition, a correspondence between the moving object and the touched article can be determined, so that subsequent prediction processing can be performed.

For example, preference of the moving object can be predicted based on the article touched by the moving object to implement analysis of the moving object. For example, services can be customized for the moving object based on an analysis result. For example, related information is recommended to the moving object based on the preference.

For another example, it can be predicted whether the article is taken away by the moving object based on the article touched by the moving object, to remind a merchant to replenish articles or remind automatic replenishment. Further, a pressure sensor can be disposed in the rack, and a weight change of the rack before and after the moving object touches the article is detected by using the pressure sensor, so as to further determine whether the moving object has taken away the article. Because a pressure sensor does not need to be disposed under each type of article, hardware costs and maintenance costs can be reduced, and determining accuracy can also be improved.

For another example, placement positions of articles can be re-planned based on a quantity of moving objects that touch articles, so that more popular articles are placed at a more conspicuous position, to achieve a better display effect, and therefore, the moving object can quickly obtain an expected article.

It can be understood that obtaining the article touched by the moving object can also be applied to other application scenarios, and details are omitted here for simplicity.

Next, an example of how to determine the article touched by the moving object by using the to-be-detected depth image is described.

The spatial coordinate information of the shelf in the rack can be pre-determined. In an optional implementation, a pixel that represents a shelf in a background image photographed by a specified photographing device can be converted based on the background image, to obtain spatial coordinate information of the shelf. For example, the pre-determining the spatial coordinate information of the shelf in the rack includes the following: obtaining a first background depth image set that is photographed by the depth photographing device at a specified angle and includes no foreground image; determining a shelf edge line in the first background depth image set; converting pixel coordinates of the shelf edge line based on a camera calibration method of the depth photographing device, to obtain two-axis spatial coordinate information in actual spatial coordinate information of a shelf; and for edge lines of the same shelf, clustering depth information of pixels of the shelf edge lines to obtain third-axis spatial coordinate information in the actual spatial coordinate information of the shelf.

The first background depth image set includes at least one background depth image. The background depth image is a depth image that is photographed by the depth photographing device at a specified angle and includes no foreground image. Including no foreground image indicates that there is no moving object in a specified aisle area. For example, when there is no moving object in the specified aisle area, the first background depth image set includes depth images obtained from the depth photographing device. For example, the first background depth image set may not be updated if the background remains unchanged. For another example, if the background may change, the first background depth image set can be updated when an update condition is satisfied.

The photographing range of the depth photographing device includes at least the outer edge of each shelf in the rack and the specified aisle area. Therefore, a shelf edge line, especially a shelf outer edge line, in the first background depth image set can be determined. In addition, for comparability, a photographing angle at which the depth photographing device obtains the background depth image is the same as a photographing angle at which the depth photographing device obtains the to-be-detected depth image.

One of ways to determine the shelf edge line in the first background depth image set can include the following: preprocessing the first background depth image set, where the preprocessing includes at least image averaging and image denoising; performing edge detection on a preprocessed image; and performing straight line detection on an image obtained through edge detection at a predetermined angle, and filtering out a straight line whose length is less than a predetermined length threshold to obtain the shelf edge line in the first background depth image set, where the predetermined angle is determined based on a relative position relationship between the depth photographing device and the rack. The preprocessing can include image processing such as image averaging and image denoising. The image averaging can mean averaging image sequences in the set to obtain an average image. The image denoising can be a process of reducing noise in an image. For example, the image denoising can be median filtering. The median filtering is a nonlinear digital filter technology that is used to remove noise from an image or another signal. Through median filtering, speckle noise, salt-and-pepper noise, etc. can be removed, and an edge feature can be stored, so that edge detection can be subsequently performed. In view of this, for example, image averaging processing can be performed on image sequences in a background depth image set, and noise in an obtained average image is removed to obtain a preprocessed image.

Edge detection can be used to identify a point with an obvious brightness change in a digital image. Through edge detection, a data volume can be reduced significantly, information that is considered unrelated can be removed, and important structural attributes of an image can be retained.

Straight line detection can be performed at the predetermined angle in edges, and the straight line whose length is less than the predetermined length threshold is filtered out, to obtain the shelf edge lint in the first background depth image set. To improve accuracy of straight line detection, the predetermined angle is determined based on the relative position relationship between the depth photographing device and the rack, so that straight line detection is performed at a fixed angle. For example, the predetermined length threshold can be determined based on an actual length of a shelf edge and the relative position relationship between the depth photographing device and the rack, so as to filter out some lines that are clearly not shelf edge lines.

It can be seen that in this implementation, image averaging processing, image denoising processing, edge detection, and straight line detection are performed on an image in a set, so that accuracy of obtaining a shelf edge line can be improved.

After the shelf edge line is obtained, because pixel coordinates in the depth image are two-dimensional coordinates, actual spatial coordinate information of a shelf edge needs to be obtained through conversion based on pixel coordinate information of the shelf edge line in the depth image. Coordinates of two axes (X-axis and Y-axis) in the spatial coordinate information can be determined based on the pixel coordinates of the shelf edge line, and coordinates of the third axis (Z-axis) in the spatial coordinate information can be determined based on the depth information of the pixels of the shelf edge lines.

In practice, during image measurement and machine vision application, to determine a relationship between a three-dimensional geometric position of a point on a surface of a spatial object and a corresponding point in an image, a geometric model of camera imaging can be established, and geometric model parameters are camera parameters. In most conditions, these parameters can be obtained through experiment and calculation, and a process of solving the parameters is referred to as camera calibration.

In this implementation of the present disclosure, a depth image set photographed by the depth photographing device from different perspectives can be obtained, camera calibration is performed by using the depth image set, and pixel coordinates of a shelf edge line can be converted based on obtained camera parameters (including a camera intrinsic parameter), to obtain two-axis spatial coordinate information, for example, X-axis spatial coordinate information and Y-axis spatial coordinate information, in actual spatial coordinate information of a shelf. The process can be referred to as an automatic calibration process. It can be understood that a specific camera calibration method can be a calibration method in related technologies, and the method is not limited here.

In addition, shelves usually have the same height, and depth information of pixels of shelf edge lines can reflect the height of the shelves. Therefore, for edge lines of the same shelf, depth information of pixels of the shelf edge lines is clustered to obtain third-axis spatial coordinate information in actual spatial coordinate information of the shelf.

It can be seen that in this implementation, a shelf edge line in a background depth image is converted, so that actual spatial coordinates of a shelf can be quickly obtained.

To obtain the spatial coordinate information of the moving object, the to-be-detected depth image can be obtained from the depth photographing device, and the foreground image used to represent the moving object is extracted from the to-be-detected depth image. In one of methods for extracting the foreground image, a background image that does not include the moving object can be compared with the to-be-detected depth image including the moving object, so as to obtain the foreground image. In this method, the foreground image can be quickly extracted. In view of this, for example, the extracting a foreground image used to represent a moving object from the to-be-detected depth image includes the following: obtaining a background image, where the background image is obtained by performing background modeling based on a second background depth image set, and the second background depth image set is a depth image set that is photographed by the depth photographing device at a specified angle and includes no foreground image; and comparing the to-be-detected depth image with the background image, and extracting the foreground image used to represent the moving object from the to-be-detected depth image.

To ensure that the background in the background image is the same as the background in the to-be-detected depth image, angles of photographing the two types of images are the same, in other words, both a depth image in the second background depth image set and the to-be-detected depth image are photographed by the depth photographing device at a specified angle. The depth image in the second background depth image set does not include the moving object, and the to-be-detected depth image may include the moving object.

The second background depth image set and the first background depth image set can be the same set, or can be different sets. Background modeling usually needs more samples than automatic calibration. Therefore, the first background depth image set can be a subset of the second background depth image set. For example, a specified quantity of background depth images in the second background depth image set are used as the first background depth image set.

The background image can be obtained in advance by performing background modeling based on the second background depth image set. For example, the second background depth image set that is photographed by the depth photographing device at a specified angle and includes no foreground image is obtained, and background modeling is performed by using the second background depth image set to obtain the background image.

In some application scenarios, the background remains unchanged. Therefore, the background image can be stored after the background image is obtained through modeling, so that the background image can be used for subsequently extracting the foreground image.

However, in some application scenarios, the background may change. Therefore, the background image is updated when an update condition is satisfied. For example, the background image is updated by updating a background model. The update condition can be that an update time arrives, an update frequency is satisfied, and it is detected that a moving object leaves a photographing area and duration in which no moving object appears in the photographing area reaches a predetermined time, or can be another trigger condition. For example, after the background image is obtained through background modeling for the first time, if it is detected that a moving object leaves a photographing area and duration in which no moving object appears in the photographing area reaches a predetermined time, background depth images photographed after this moment are obtained from the depth photographing device, to obtain a second background depth image set, and the background image is updated by using the second background depth image set.

Figure 1C:
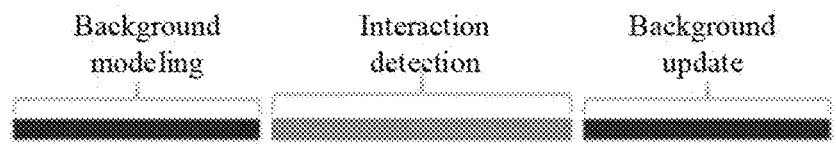
FIG. 1C is a schematic diagram illustrating a background image update, according to an example implementation of the present specification.

As shown in FIG. 1C. FIG. 1C is a schematic diagram illustrating a background image update, according to an example implementation of the present specification. After a background image is obtained by performing background modeling for the first time, interaction detection can be performed. The background image can be updated when an update condition is satisfied. For example, if there is no moving target or person, a specified quantity (e.g., 300 frames) of depth images are obtained from the depth photographing device (the set is used as the second background depth image set), and are used to train a background model and obtain the background image. After a period of time, if there is no moving object after background noise is removed from a photographing area of the depth photographing device in a specified time period (e.g., 60 s), the background model is updated by using a specified quantity of depth images photographed by the depth photographing device after the specified time period, to obtain an updated background image.

It can be understood that the foreground image used to represent the moving object can be extracted from the to-be-detected depth image in other ways, and the methods are not listed here.

After the foreground image is obtained, the spatial coordinate information of the moving object can be obtained based on the foreground image. Because coordinates in the foreground image are pixel coordinates, to obtain the spatial coordinate information of the moving object, the pixel coordinates in the foreground image can be converted to obtain the spatial coordinate information of the moving object. The spatial coordinate information of the moving object is compared with the spatial coordinate information of the shelf in the rack, so as to determine the article touched by the moving object. In view of this, spatial coordinate information of a part closest to the rack in the moving object can be obtained only based on the foreground image. For example, the moving object usually uses a hand to touch an article. Therefore, the part closest to the rack in the moving object can be the hand. Therefore, there is no need to obtain the spatial coordinate information of the whole moving object, and only the spatial coordinate information of the part closest to the rack in the moving object is obtained, so that efficiency of obtaining spatial coordinate information can be increased. For example, the spatial coordinate information of the moving object includes the spatial coordinate information of the part closest to the rack in the moving object, and the obtaining, by the processing device, spatial coordinate information of the moving object based on the foreground image includes the following: converting pixel coordinates of a part closest to the rack in the foreground image based on a camera calibration method of the depth photographing device, to obtain two-axis spatial coordinate information of the part closest to the rack in the moving object; and determining third-axis spatial coordinate information of the part closest to the rack in the moving object based on depth information of a pixel of the part closest to the rack in the foreground image.

The two-axis spatial coordinate information can be X-axis spatial coordinate information and Y-axis spatial coordinate information, and the third type of spatial coordinate information can be Z-axis spatial coordinate information.

After the spatial coordinate information of the moving object and the spatial coordinate information of the shelf in the rack are obtained, the spatial coordinate information of the moving object can be compared with the spatial coordinate information of the shelf in the rack, and the article touched by the moving object is determined based on a comparison result and one or more articles on the shelf.

In one of application scenarios, articles placed on the same shelf in the rack are the same, and that the processing device is configured to compare the spatial coordinate information of the moving object with spatial coordinate information of a shelf in the rack, and determine an article touched by the moving object based on a comparison result and one or more articles on the shelf can include the following: determining, based on the spatial coordinate information of the moving object and the spatial coordinate information of the shelf in the rack, whether the moving object extends into the rack by using the two-axis spatial coordinate information obtained by converting pixel coordinates in the spatial coordinate information, and determining a shelf into which the moving object extends in the rack by using the third-axis spatial coordinate information obtained by converting depth information in the spatial coordinate information; and determining an article corresponding to the determined shelf as the article touched by the moving object based on a predetermined correspondence between shelves and articles.

Because articles on each shelf are the same, the article touched by the moving object can be determined provided that whether the moving object extends into the rack and the shelf into which the moving object extends in the rack are determined, so that determining accuracy can be improved.

Figure 1D:
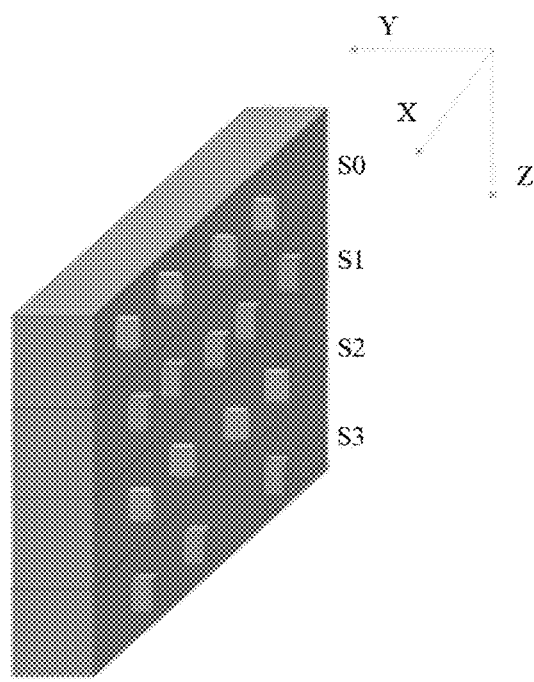
FIG. 1D is a schematic diagram illustrating detection of interaction between a moving object and a rack, according to an example implementation of the present specification.

A point of the moving object closest to the rack, for example, a point in a fingertip area of the hand, is detected. It is determined whether a fingertip extends into a rack plane based on spatial coordinate information of the point and spatial coordinate information of a shelf. As shown in FIG. 1D, FIG. 1D is a schematic diagram illustrating detection of interaction between a moving object and a rack, according to an example implementation of the present specification. In an automatic calibration process, if the rack plane y=Y0, and yf≥Y0 based on coordinates F=(xf, yf, zf) of the fingertip, it is determined that the moving object has touched the rack. The depth photographing device obtains depth information of the fingertip, and determines a relationship between the fingertip F=(xf, yf, zf) and a height of a shelf through comparison, so as to determine an interaction shelf. An article taken away by the moving object is finally determined based on the placement of articles on the shelf. H0 is a depth at the bottom of the rack. If zf−H0≤S0, it is determined that the article is on the first shelf; if S0<zf−H0≤S1, it is determined that the article is on the second shelf; if S1<zf−H0≤S2, it is determined that the article is on the third shelf; and so on.

In another application scenario, articles placed on the same shelf in the rack are different. Different articles are placed together, and a correspondence between a placement position range and a placement shelf of an article is obtained. Therefore, after the spatial coordinate information of the moving object and the spatial coordinate information of the shelf in the rack are determined, whether the moving object extends into the rack and a specific area into which the moving object extends in the rack can be determined by using the two-axis spatial coordinate information (X-axis spatial coordinate information and Y-axis spatial coordinate information) obtained by converting pixel coordinates in the spatial coordinate information based on the spatial coordinate information of the moving object and the spatial coordinate information of the shelf in the rack. Also, the shelf into which the moving object extends in the rack can be determined by using the third-axis spatial coordinate information (Z-axis spatial coordinate information) obtained by converting depth information in the spatial coordinate information, and the article touched by the moving object can be determined based on a correspondence between a name, a placement position range, and a placement shelf of an article.

In practice, there may be more than one moving object in a specified area. A moving path of the moving object can be determined to collect statistics on an article touched by the same moving object in the whole process. In an optional implementation, foreground positions of foreground images extracted from adjacent to-be-detected depth images can be compared, where the adjacent to-be-detected depth images are to-be-detected depth images photographed by the depth photographing device at adjacent time points; and a group of foreground images closest to each other in adjacent to-be-detected depth images are determined as the same foreground image, and a moving path of the moving object corresponding to the foreground image is obtained.

For adjacent to-be-detected depth images, a collection interval between two to-be-detected depth images is relatively short, and a moving distance of the moving object is relatively short. Therefore, if two adjacent to-be-detected depth images are compared, a probability of the same foreground image is relatively large, and a group of foreground images closest to each other in the adjacent to-be-detected depth images can be determined as the same foreground image, in other words, it is determined that the group of foreground images are foreground images of the same moving object photographed at different moments.

Figure 1E:
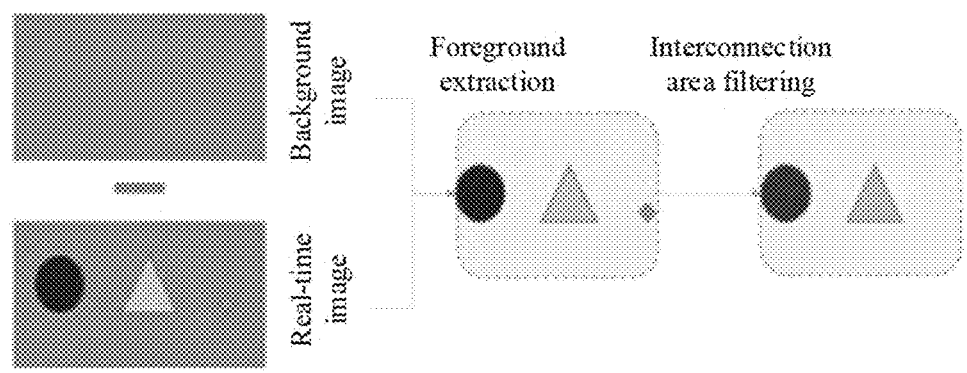
FIG. 1E is a schematic diagram illustrating moving object detection, according to an example implementation of the present specification.
Figure 1F:
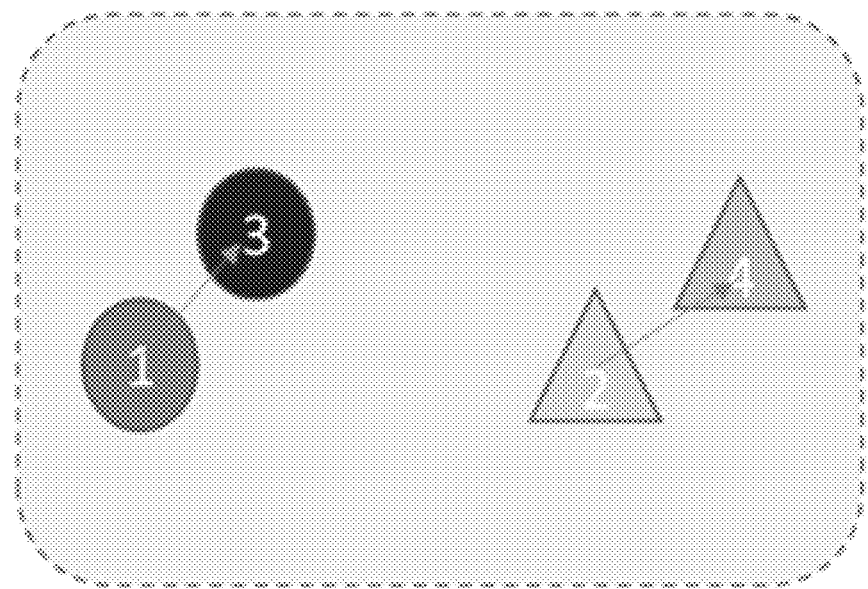
FIG. 1F is a schematic diagram illustrating moving object matching tracking, according to an example implementation of the present specification.

Further, after the foreground image is extracted, an interconnection area smaller than a specified area can be filtered out, so as to obtain a foreground image that includes only the moving object. As shown in FIG. 1E, FIG. 1E is a schematic diagram illustrating moving object detection, according to an example implementation of the present specification. As shown in FIG. 1F, FIG. 1F is a schematic diagram illustrating moving object matching tracking, according to an example implementation of the present specification. After a background image is obtained, the background image can be compared with a real-time image (a to-be-detected depth image), and the foreground is extracted from the real-time image to obtain a foreground image. Moving object matching tracking can be implemented by obtaining a minimum distance between centers of frames of interconnection areas through comparison. For example, 1 and 2 are interconnection areas in the first frame of image, and 3 and 4 are interconnection areas in the second frame of image. A distance between 1 and 3 and a distance between 2 and 3 are compared, so that it can be determined that 1 is the previous frame of 3. Similarly, 2 is the previous frame of 4. Therefore, moving paths of different moving objects can be obtained.

Various technical features in the previous implementations can be combined randomly, provided that there is no conflict or contradiction if they are combined. Combinations are not described one by one for limitation of length. Therefore, any combination of the various technical features in the previous implementations also falls within the scope disclosed in the present specification.

Corresponding to the previous implementation of the interaction behavior detection system, the present specification further provides an implementation of an interaction behavior detection method.

Figure 2:
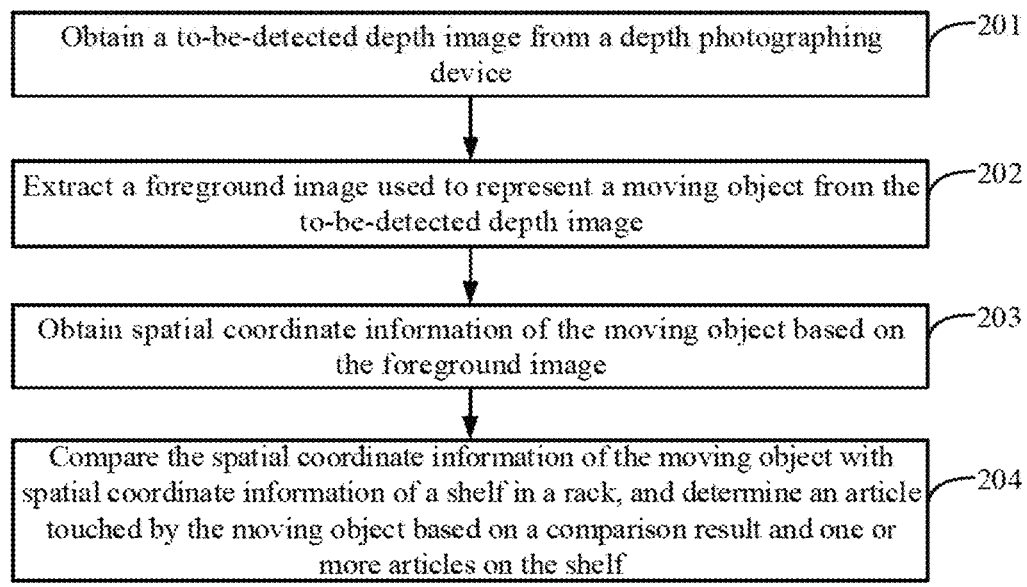
FIG. 2 is a flowchart illustrating an implementation of an interaction behavior detection method, according to the present specification.

As shown in FIG. 2, FIG. 2 is a flowchart illustrating an implementation of an interaction behavior detection method, according to the present specification. The method can include the following steps 201 to 204.

In step 201, a to-be-detected depth image is obtained from a depth photographing device, where the depth photographing device is disposed above a rack, and a photographing range of the depth photographing device includes an outer edge of each shelf in the rack and a specified aisle area.

In step 202, a foreground image used to represent a moving object is extracted from the to-be-detected depth image.

In step 203, spatial coordinate information of the moving object is obtained based on the foreground image.

In step 204, the spatial coordinate information of the moving object is compared with spatial coordinate information of a shelf in the rack, and an article touched by the moving object is determined based on a comparison result and one or more articles on the shelf, where the spatial coordinate information of the shelf is obtained based on a background depth image, and the background depth image is a depth image that is photographed by the depth photographing device at a specified angle and includes no foreground image.

It can be seen from the previous implementation that, a to-be-detected depth image photographed by a depth photographing device is obtained, a foreground image used to represent a moving object is extracted from the to-be-detected depth image, spatial coordinate information of the moving object is obtained based on the foreground image, the spatial coordinate information of the moving object is compared with spatial coordinate information of a shelf in a rack, and an article touched by the moving object is determined based on a comparison result and one or more articles on the shelf. As such, the article touched by the moving object can be determined without a need to dispose a pressure sensor at each position of each shelf, so that maintenance costs are reduced. In addition, a correspondence between the moving object and the touched article can be determined, so that subsequent prediction processing can be performed.

In an optional implementation, the pre-determining process of the spatial coordinate information of the shelf includes the following: obtaining a first background depth image set that is photographed by the depth photographing device at a specified angle and includes no foreground image; determining a shelf edge line in the first background depth image set; converting pixel coordinates of the shelf edge line based on a camera calibration method of the depth photographing device, to obtain two-axis spatial coordinate information in actual spatial coordinate information of a shelf; and for edge lines of the same shelf, clustering depth information of pixels of the shelf edge lines to obtain third-axis spatial coordinate information in the actual spatial coordinate information of the shelf.

In an optional implementation, the determining a shelf edge line in the first background depth image set includes the following: preprocessing the first background depth image set, where the preprocessing includes at least image averaging and image denoising; performing edge detection on a preprocessed image; and performing straight line detection on an image obtained through edge detection at a predetermined angle, and filtering out a straight line whose length is less than a predetermined length threshold to obtain the shelf edge line in the first background depth image set, where the predetermined angle is determined based on a relative position relationship between the depth photographing device and the rack.

In an optional implementation, the extracting a foreground image used to represent a moving object from the to-be-detected depth image includes the following: obtaining a background image, where the background image is obtained by performing background modeling based on a second background depth image set, and the second background depth image set is a depth image set that is photographed by the depth photographing device at a specified angle and includes no foreground image; and comparing the to-be-detected depth image with the background image, and extracting the foreground image used to represent the moving object from the to-be-detected depth image.

In an optional implementation, the method further includes the following: comparing foreground positions of foreground images extracted from adjacent to-be-detected depth images, where the adjacent to-be-detected depth images are to-be-detected depth images photographed by the depth photographing device at adjacent time points; and determining a group of foreground images closest to each other in adjacent to-be-detected depth images as the same foreground image, and obtaining a moving path of the moving object corresponding to the foreground image.

In an optional implementation, the spatial coordinate information of the moving object includes spatial coordinate information of a part closest to the rack in the moving object, and the obtaining spatial coordinate information of the moving object based on the foreground image includes the following: converting pixel coordinates of a part closest to the rack in the foreground image based on a camera calibration method of the depth photographing device, to obtain two-axis spatial coordinate information of the part closest to the rack in the moving object; and determining third-axis spatial coordinate information of the part closest to the rack in the moving object based on depth information of a pixel of the part closest to the rack in the foreground image.

In an optional implementation, articles placed on the same shelf in the rack are the same, and the comparing the spatial coordinate information of the moving object with spatial coordinate information of a shelf in the rack, and determining an article touched by the moving object based on a comparison result and one or more articles on the shelf includes the following: determining, based on the spatial coordinate information of the moving object and the spatial coordinate information of the shelf in the rack, whether the moving object extends into the rack by using the two-axis spatial coordinate information obtained by converting pixel coordinates in the spatial coordinate information, and determining a shelf into which the moving object extends in the rack by using the third-axis spatial coordinate information obtained by converting depth information in the spatial coordinate information; and determining an article corresponding to the determined shelf as the article touched by the moving object based on a predetermined correspondence between shelves and articles.

It can be understood that related technologies of the interaction behavior detection method in implementations of the present specification are the same as those of the processing method of the processing device in the previously described interaction behavior detection system. Details are omitted here for simplicity. In addition, various technical features in the previous implementations can be combined randomly, provided that there is no conflict or contradiction if they are combined.

Figure 3:
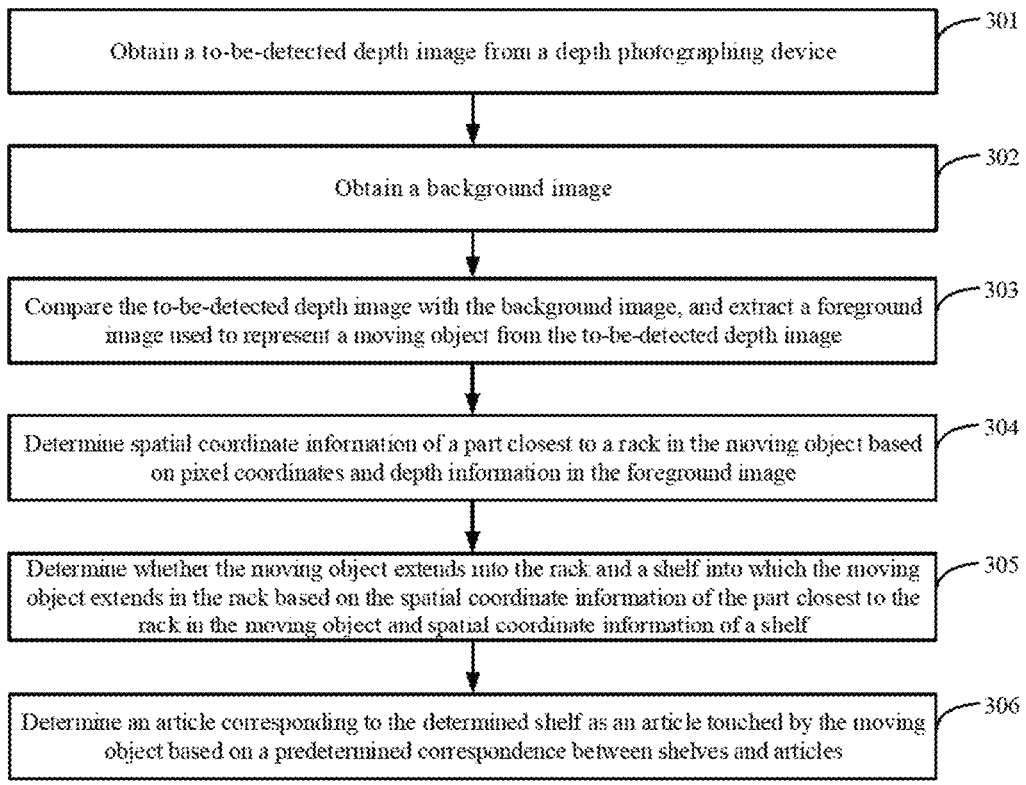
FIG. 3 is a flowchart illustrating another implementation of an interaction behavior detection method, according to the present specification.

The following uses one of combinations as an example for description. As shown in FIG. 3, FIG. 3 is a flowchart illustrating another implementation of an interaction behavior detection method, according to the present specification. The method can be applied to an electronic device, and includes the following steps 301 to 306.

In step 301, a to-be-detected depth image is obtained from a depth photographing device, where the depth photographing device is disposed above a rack, and a photographing range of the depth photographing device includes an outer edge of each shelf in the rack and a specified aisle area.

In step 302, a background image is obtained.

The background image is obtained by performing background modeling based on a second background depth image set, and the second background depth image set is a depth image set that is photographed by the depth photographing device at a specified angle and includes no foreground image.

In step 303, the to-be-detected depth image is compared with the background image, and a foreground image used to represent a moving object is extracted from the to-be-detected depth image.

In step 304, spatial coordinate information of a part closest to the rack in the moving object is determined based on pixel coordinates and depth information in the foreground image.

Pixel coordinates of a part closest to the rack in the foreground image can be converted based on a camera calibration method of the depth photographing device, to obtain two-axis spatial coordinate information of the part closest to the rack in the moving object. Third-axis spatial coordinate information of the part closest to the rack in the moving object is determined based on depth information of a pixel of the part closest to the rack in the foreground image.

In step 305, whether the moving object extends into the rack and a shelf into which the moving object extends in the rack are determined based on the spatial coordinate information of the part closest to the rack in the moving object and spatial coordinate information of a shelf in the rack.

It is determined, based on the spatial coordinate information of the moving object and the spatial coordinate information of the shelf in the rack, whether the moving object extends into the rack by using the two-axis spatial coordinate information obtained by converting pixel coordinates in the spatial coordinate information, and the shelf into which the moving object extends in the rack is determined by using the third-axis spatial coordinate information obtained by converting depth information in the spatial coordinate information.

In step 306, an article corresponding to the determined shelf is determined as an article touched by the moving object based on a predetermined correspondence between shelves and articles.

The spatial coordinate information of the moving object includes the spatial coordinate information of the part closest to the rack in the moving object, articles placed on the same shelf in the rack are the same, the spatial coordinate information of the shelf is obtained based on a background depth image, and the background depth image is a depth image that is photographed by the depth photographing device at a specified angle and includes no foreground image.

Corresponding to the previous implementation of the interaction behavior detection method, the present specification further provides implementations of an interaction behavior detection apparatus and an electronic device to which the interaction behavior detection apparatus is applied.

Figure 4:
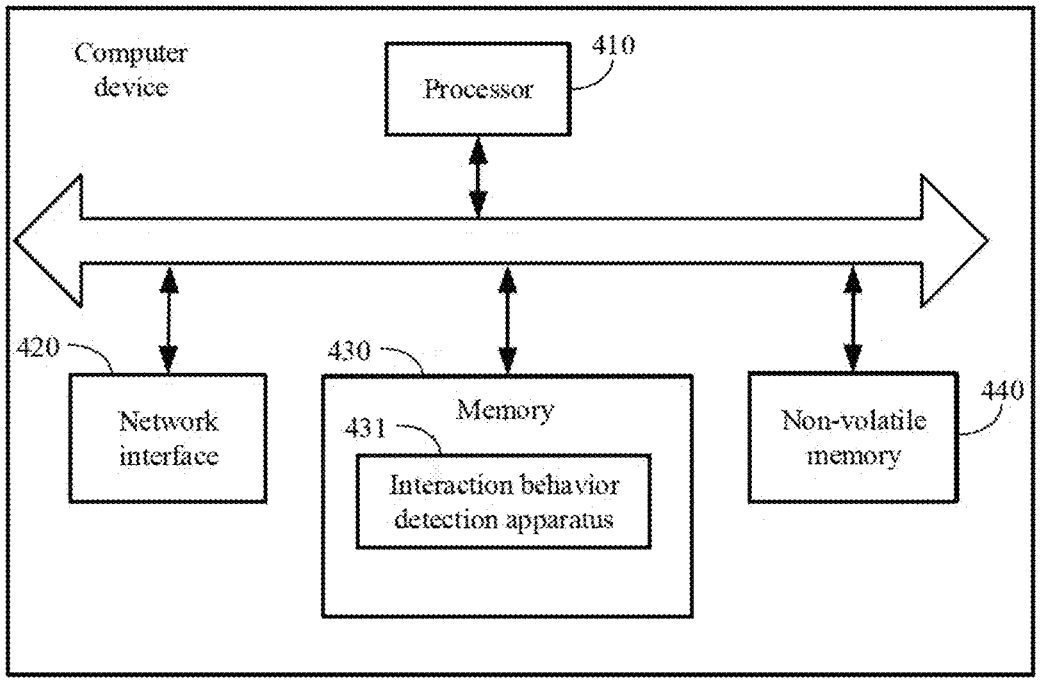
FIG. 4 is a hardware structural diagram illustrating a computer device where an interaction behavior detection apparatus is located, according to the present specification.

The implementation of the interaction behavior detection apparatus in the present specification can be applied to a computer device. The apparatus implementation can be implemented by software, hardware, or a combination of hardware and software. Software implementation is used as an example. As a logical apparatus, the apparatus is formed by reading a corresponding computer program instruction in a non-volatile memory to a memory by a processor of a computer device where the apparatus is located. In terms of hardware, FIG. 4 is a hardware structural diagram illustrating a computer device where the interaction behavior detection apparatus is located in the present specification. In addition to a processor 410, a memory 430, a network interface 420, and a non-volatile memory 440 shown in FIG. 4, the computer device where the apparatus 431 is located in the implementations can usually include other hardware based on an actual function of the device. Details are omitted here for simplicity.

Figure 5:
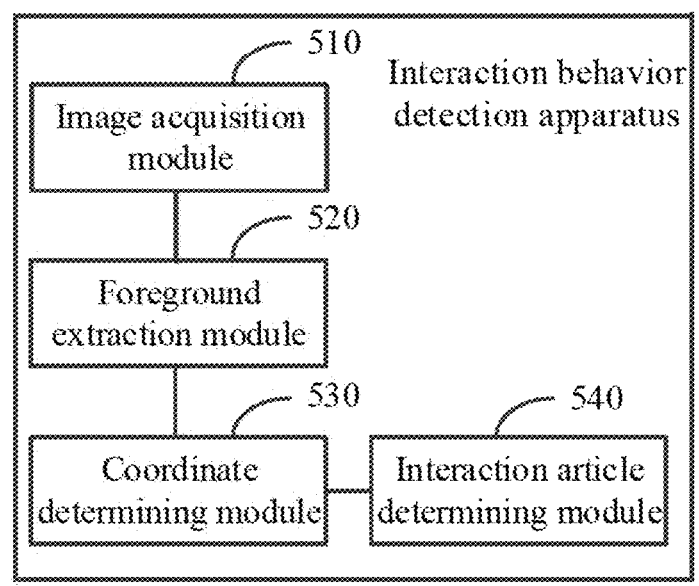
FIG. 5 is a block diagram illustrating an interaction behavior detection apparatus, according to an example implementation of the present specification.

As shown in FIG. 5, FIG. 5 is a block diagram illustrating an interaction behavior detection apparatus, according to an example implementation of the present specification. The apparatus includes the following: an image acquisition module 510, configured to obtain a to-be-detected depth image from a depth photographing device, where the depth photographing device is disposed above a rack, and a photographing range of the depth photographing device includes an outer edge of each shelf in the rack and a specified aisle area; a foreground extraction module 520, configured to extract a foreground image used to represent a moving object from the to-be-detected depth image; a coordinate determining module 530, configured to obtain spatial coordinate information of the moving object based on the foreground image; and an interaction article determining module 540, configured to compare the spatial coordinate information of the moving object with spatial coordinate information of a shelf in the rack, and determine an article touched by the moving object based on a comparison result and one or more articles on the shelf, where the spatial coordinate information of the shelf is obtained based on a background depth image, and the background depth image is a depth image that is photographed by the depth photographing device at a specified angle and includes no foreground image.

In an optional implementation, the apparatus further includes an information pre-determining module (not shown in FIG. 5), specifically configured to obtain a first background depth image set that is photographed by the depth photographing device at a specified angle and includes no foreground image; determine a shelf edge line in the first background depth image set; convert pixel coordinates of the shelf edge line based on a camera calibration method of the depth photographing device, to obtain two-axis spatial coordinate information in actual spatial coordinate information of a shelf; and for edge lines of the same shelf, cluster depth information of pixels of the shelf edge lines to obtain third-axis spatial coordinate information in the actual spatial coordinate information of the shelf.

In an optional implementation, the determining, by the information pre-determining module, a shelf edge line in the first background depth image set includes the following: preprocessing the first background depth image set, where the preprocessing includes at least image averaging and image denoising; performing edge detection on a preprocessed image; and performing straight line detection on an image obtained through edge detection at a predetermined angle, and filtering out a straight line whose length is less than a predetermined length threshold to obtain the shelf edge line in the first background depth image set, where the predetermined angle is determined based on a relative position relationship between the depth photographing device and the rack.

In an optional implementation, the foreground extraction module 520 is specifically configured to obtain a background image, where the background image is obtained by performing background modeling based on a second background depth image set, and the second background depth image set is a depth image set that is photographed by the depth photographing device at a specified angle and includes no foreground image; and compare the to-be-detected depth image with the background image, and extract the foreground image used to represent the moving object from the to-be-detected depth image.

In an optional implementation, the apparatus further includes a path determining module (not shown in FIG. 5), configured to compare foreground positions of foreground images extracted from adjacent to-be-detected depth images, where the adjacent to-be-detected depth images are to-be-detected depth images photographed by the depth photographing device at adjacent time points; and determine a group of foreground images closest to each other in adjacent to-be-detected depth images as the same foreground image, and obtain a moving path of the moving object corresponding to the foreground image.

In an optional implementation, the spatial coordinate information of the moving object includes spatial coordinate information of a part closest to the rack in the moving object, and the coordinate determining module 530 is specifically configured to convert pixel coordinates of a part closest to the rack in the foreground image based on a camera calibration method of the depth photographing device, to obtain two-axis spatial coordinate information of the part closest to the rack in the moving object; and determine third-axis spatial coordinate information of the part closest to the rack in the moving object based on depth information of a pixel of the part closest to the rack in the foreground image.

In an optional implementation, articles placed on the same shelf in the rack are the same, and the interaction article determining module 540 is specifically configured to determine, based on the spatial coordinate information of the moving object and the spatial coordinate information of the shelf in the rack, whether the moving object extends into the rack by using the two-axis spatial coordinate information obtained by converting pixel coordinates in the spatial coordinate information, and determine a shelf into which the moving object extends in the rack by using the third-axis spatial coordinate information obtained by converting depth information in the spatial coordinate information; and determine an article corresponding to the determined shelf as the article touched by the moving object based on a predetermined correspondence between shelves and articles.

Because apparatus implementations basically correspond to method implementations, for related parts, references can be made to related descriptions in the method implementations. The previously described apparatus implementations are merely examples. The modules described as separate parts may or may not be physically separate, and parts displayed as modules may or may not be physical modules, and may be located in one position, or may be distributed on a plurality of network modules. Some or all of the modules can be selected based on actual needs to achieve the objectives of the solutions of the present specification. A person of ordinary skill in the art can understand and implement the implementations of the present specification without creative efforts.

Correspondingly, an implementation of the present specification further provides a computer device, including a processor and a memory, configured to store a processor-executable instruction. The processor is configured to obtain a to-be-detected depth image from a depth photographing device, where the depth photographing device is disposed above a rack, and a photographing range of the depth photographing device includes an outer edge of each shelf in the rack and a specified aisle area; extract a foreground image used to represent a moving object from the to-be-detected depth image, and obtain spatial coordinate information of the moving object based on the foreground image; and compare the spatial coordinate information of the moving object with spatial coordinate information of a shelf in the rack, and determine an article touched by the moving object based on a comparison result and one or more articles on the shelf, where the spatial coordinate information of the shelf is obtained based on a background depth image, and the background depth image is a depth image that is photographed by the depth photographing device at a specified angle and includes no foreground image.

The implementations of the present specification are described in a progressive way. For same or similar parts of the implementations, references can be made to the implementations. Each implementation focuses on a difference from other implementations. Particularly, device implementations are basically similar to method implementations, and therefore, are described briefly. For related parts, references can be made to related descriptions in the method implementations.

A computer storage medium is provided, where the storage medium stores a program instruction, and the program instruction includes the following: obtaining a to-be-detected depth image from a depth photographing device, where the depth photographing device is disposed above a rack, and a photographing range of the depth photographing device includes an outer edge of each shelf in the rack and a specified aisle area; extracting a foreground image used to represent a moving object from the to-be-detected depth image, and obtaining spatial coordinate information of the moving object based on the foreground image; and comparing the spatial coordinate information of the moving object with spatial coordinate information of a shelf in the rack, and determining an article touched by the moving object based on a comparison result and one or more articles on the shelf, where the spatial coordinate information of the shelf is obtained based on a background depth image, and the background depth image is a depth image that is photographed by the depth photographing device at a specified angle and includes no foreground image.

The implementations of the present specification can use a form of a computer program product that is implemented on one or more storage media (including but not limited to a disk memory, a CD-ROM, an optical memory, etc.) that include program code. The compute usable storage media include persistent, non-persistent, movable, and unmovable media that can store information by using any method or technology. The information can be a computer readable instruction, a data structure, a program module, or other data. Examples of the computer storage medium include but are not limited to a phase change random access memory (PRAM), a static RAM (SRAM), a dynamic RAM (DRAM), a RAM of another type, a read-only memory (ROM), an electrically erasable programmable ROM (EEPROM), a flash memory or another memory technology, a compact disc ROM (CD-ROM), a digital versatile disc (DVD), or another optical storage, a cassette, a cassette magnetic disk storage, or another magnetic storage device or any other non-transmission medium. The computer storage medium can be configured to store information that can be accessed by a computing device.

A person skilled in the art can easily figure out another implementation of the present specification after thinking over the present specification and practicing the present disclosure here. The present specification is intended to cover any variations, uses, or adaptations of the present specification, and these variations, uses, or adaptations follow the general principles of the present specification and include common knowledge or conventional techniques that are not disclosed in the technical field of the present specification. The present specification and the implementations are merely considered as examples, and the actual scope and the spirit of the present specification are pointed out by the following claims.

It should be understood that the present specification is not limited to the precise structures that have been described above and shown in the drawings, and various modifications and changes can be made without departing from the scope of the present specification. The scope of the present specification is limited by the appended claims only.

The previous descriptions are merely preferred implementations of the present specification, but are not intended to limit the present specification. Any modification, equivalent replacement, or improvement made without departing from the spirit and principle of the present specification shall fall within the protection scope of the present specification.

What is claimed is:

1. A computer-implemented method for interaction behavior detection, comprising:
    obtaining a depth image from a depth camera, wherein the depth camera is disposed above a rack, and a filming range of the depth camera covers an outer edge of each shelf in the rack and an aisle;
    extracting a foreground image associated with a moving object from the depth image;
    obtaining spatial coordinates of the moving object based on the foreground image; and
    determining an object on a shelf in the rack that is physically contacted by the moving object based on comparing the spatial coordinates of the moving object with spatial coordinates of the shelf, wherein the spatial coordinates of the shelf are determined by:
        obtaining a background depth image set photographed by the depth camera at a predetermined angle unobstructed by the moving object;
        determining a shelf edge of the shelf based on the background depth image set, wherein determining the shelf edge of the shelf comprises:
            preprocessing the background depth image set to generate preprocessed images, wherein the preprocessing is performed based on image averaging and image denoising;
            performing edge detection on the preprocessed images to obtain edge detected images;
            performing straight line detection from the predetermined angle on the edge detected images to obtain one or more straight lines, wherein the predetermined angle is determined based on a relative position between the depth camera and the rack; and
            filtering out straight lines of the one or more straight lines that are shorter than a predetermined length threshold to obtain the shelf edge;
        converting pixel coordinates of pixels corresponding to the shelf edge in the background depth image set to first-dimension coordinates and second-dimension coordinates of the spatial coordinates of the shelf based on calibrating the depth camera; and obtaining third-dimension coordinates of the spatial coordinates of the shelf based on depths of the pixels corresponding to the shelf edge.

2. The computer-implemented method of claim 1, wherein the depth image set is a first background depth image set, the predetermined angle is a first predetermined angle, and the extracting the foreground image comprises:
    obtaining a background image by performing background modeling based on a second background depth image set, and the second background depth image set is a depth image set photographed by the depth camera at a second predetermined angle unobstructed by the moving object; and
    extracting the foreground image from the depth image based on comparing the depth image with the background image.

3. The computer-implemented method of claim 2, wherein the depth image is one of a set of adjacent depth images obtained by the depth camera, and the method further comprising:
    determining a set of foreground objects from the set of adjacent depth images, wherein each of the set of foreground objects has a smallest depth among foreground objects of a corresponding depth image of the set of adjacent depth images;
    extracting a set of foreground images corresponding to the set of foreground objects from the set of adjacent depth images; and
    obtaining a moving path of the moving object based on the set of foreground images.

4. The computer-implemented method of claim 1, wherein the spatial coordinates of the moving object are spatial coordinates of a position on the moving object that is closest to the rack, and the obtaining the spatial coordinates of the moving object comprises:
    converting pixel coordinates of pixels corresponding to a position in the foreground image to first-dimension coordinates and second-dimension coordinates of the position based on calibrating the depth camera; and obtaining third-dimension coordinates of the spatial coordinates of the shelf based on depths of the pixels corresponding to the position.

5. The computer-implemented method of claim 4, wherein objects on the shelf in the rack are same objects, and the determining the object that is physically contacted by the moving object comprises:
   determining, based on the spatial coordinates of the moving object and the spatial coordinates of the shelf, that the moving object extends into the rack based on the first-dimension coordinates and the second-dimension coordinates;
   determining that the shelf of the rack is extended into by the moving object based on the third-dimension coordinates; and
   determining the object based on a predetermined correspondence between the shelf and the objects on the shelf.

6. A computer-implemented system for interaction behavior detection, comprising:
   one or more computers, and
   one or more computer memory devices interoperably coupled with the one or more computers and having tangible, non-transitory, machine-readable media storing one or more instructions that, when executed by the one or more computers, perform operations comprising:
      obtaining a depth image from a depth camera, wherein the depth camera is disposed above a rack, and a filming range of the depth camera covers an outer edge of each shelf in the rack and an aisle;
      extracting a foreground image associated with a moving object from the depth image;
      obtaining spatial coordinates of the moving object based on the foreground image; and
      determining an object on a shelf in the rack that is physically contacted by the moving object based on comparing the spatial coordinates of the moving object with spatial coordinates of the shelf, wherein the spatial coordinates of the shelf are determined by:
         obtaining a background depth image set photographed by the depth camera at a predetermined angle unobstructed by the moving object;
         determining a shelf edge of the shelf based on the background depth image set, wherein determining the shelf edge of the shelf comprises:
            preprocessing the background depth image set to generate preprocessed images, wherein the preprocessing is performed based on image averaging and image denoising;
            performing edge detection on the preprocessed images to obtain edge detected images;
            performing straight line detection from the predetermined angle on the edge detected images to obtain one or more straight lines, wherein the predetermined angle is determined based on a relative position between the depth camera and the rack; and
            filtering out straight lines of the one or more straight lines that are shorter than a predetermined length threshold to obtain the shelf edge;
         converting pixel coordinates of pixels corresponding to the shelf edge in the background depth image set to first-dimension coordinates and second-dimension coordinates of the spatial coordinates of the shelf based on calibrating the depth camera;
         and obtaining third-dimension coordinates of the spatial coordinates of the shelf based on depths of the pixels corresponding to the shelf edge.

7. The computer-implemented system of claim 6, wherein the depth image set is a first background depth image set, the predetermined angle is a first predetermined angle, and the extracting the foreground image comprises:
   obtaining a background image by performing background modeling based on a second background depth image set, and the second background depth image set is a depth image set photographed by the depth camera at a second predetermined angle unobstructed by the moving object; and
   extracting the foreground image from the depth image based on comparing the depth image with the background image.

8. The computer-implemented system of claim 7, wherein the depth image is one of a set of adjacent depth images obtained by the depth camera, and the operations further comprising:
   determining a set of foreground objects from the set of adjacent depth images, wherein each of the set of foreground objects has a smallest depth among foreground objects of a corresponding depth image of the set of adjacent depth images;
   extracting a set of foreground images corresponding to the set of foreground objects from the set of adjacent depth images; and
   obtaining a moving path of the moving object based on the set of foreground images.

9. The computer-implemented system of claim 6, wherein the spatial coordinates of the moving object are spatial coordinates of a position on the moving object that is closest to the rack, and the obtaining the spatial coordinates of the moving object comprises:
   converting pixel coordinates of pixels corresponding to a position in the foreground image to first-dimension coordinates and second-dimension coordinates of the position based on calibrating the depth camera; and
   obtaining third-dimension coordinates of the spatial coordinates of the shelf based on depths of the pixels corresponding to the position.

10. The computer-implemented system of claim 9, wherein objects on the shelf in the rack are same objects, and the determining the object that is physically contacted by the moving object comprises:
   determining, based on the spatial coordinates of the moving object and the spatial coordinates of the shelf, that the moving object extends into the rack based on the first-dimension coordinates and the second-dimension coordinates;
   determining that the shelf of the rack is extended into by the moving object based on the third-dimension coordinates; and
   determining the object based on a predetermined correspondence between the shelf and the objects on the shelf.

11. A non-transitory, computer-readable medium storing one or more instructions executable by a computer system to perform operations for interaction behavior detection, comprising:
   obtaining a depth image from a depth camera, wherein the depth camera is disposed above a rack, and a filming range of the depth camera covers an outer edge of each shelf in the rack and an aisle;
   extracting a foreground image associated with a moving object from the depth image;

obtaining spatial coordinates of the moving object based on the foreground image; and determining an object on a shelf in the rack that is physically contacted by the moving object based on comparing the spatial coordinates of the moving object with spatial coordinates of the shelf, wherein the spatial coordinates of the shelf are determined by:

obtaining a background depth image set photographed by the depth camera at a predetermined angle unobstructed by the moving object;

determining a shelf edge of the shelf based on the background depth image set, wherein determining the shelf edge of the shelf comprises:

preprocessing the background depth image set to generate preprocessed images, wherein the preprocessing is performed based on image averaging and image denoising;

performing edge detection on the preprocessed images to obtain edge detected images;

performing straight line detection from the predetermined angle on the edge detected images to obtain one or more straight lines, wherein the predetermined angle is determined based on a relative position between the depth camera and the rack; and filtering out straight lines of the one or more straight lines that are shorter than a predetermined length threshold to obtain the shelf edge;

converting pixel coordinates of pixels corresponding to the shelf edge in the background depth image set to first-dimension coordinates and second-dimension coordinates of the spatial coordinates of the shelf based on calibrating the depth camera; and obtaining third-dimension coordinates of the spatial coordinates of the shelf based on depths of the pixels corresponding to the shelf edge.

12. The non-transitory, computer-readable medium of claim 11, wherein the depth image set is a first background depth image set, the predetermined angle is a first predetermined angle, and extracting the foreground image comprises:

obtaining a background image by performing background modeling based on a second background depth image set, and the second background depth image set is a depth image set photographed by the depth camera at a second predetermined angle unobstructed by the moving object; and extracting the foreground image from the depth image based on comparing the depth image with the background image.

13. The non-transitory, computer-readable medium of claim 12, wherein:

the depth image is one of a set of adjacent depth images obtained by the depth camera; and the operations for interaction behavior detection further comprise:

determining a set of foreground objects from the set of adjacent depth images, wherein each of the set of foreground objects has a smallest depth among foreground objects of a corresponding depth image of the set of adjacent depth images;

extracting a set of foreground images corresponding to the set of foreground objects from the set of adjacent depth images; and obtaining a moving path of the moving object based on the set of foreground images.

14. The non-transitory, computer-readable medium of claim 11, wherein the spatial coordinates of the moving object are spatial coordinates of a position on the moving object that is closest to the rack, and the obtaining the spatial coordinates of the moving object comprises:

converting pixel coordinates of pixels corresponding to a position in the foreground image to first-dimension coordinates and second-dimension coordinates of the position based on calibrating the depth camera; and obtaining third-dimension coordinates of the spatial coordinates of the shelf based on depths of the pixels corresponding to the position.

15. The non-transitory, computer-readable medium of claim 14, wherein objects on the shelf in the rack are same objects, and the determining the object that is physically contacted by the moving object comprises:

determining, based on the spatial coordinates of the moving object and the spatial coordinates of the shelf, that the moving object extends into the rack based on the first-dimension coordinates and the second-dimension coordinates;

determining that the shelf of the rack is extended into by the moving object based on the third-dimension coordinates; and determining the object based on a predetermined correspondence between the shelf and the objects on the shelf.

* * * * *